United States Patent
De Foy et al.

(10) Patent No.: US 9,838,473 B2
(45) Date of Patent: *Dec. 5, 2017

(54) METHODS AND SYSTEMS FOR INTEGRATION OF PEER-TO-PEER (P2P) NETWORKS WITH CONTENT DELIVERY NETWORKS (CDNS)

(71) Applicant: InterDigital Patent Holdings, Inc., Wilmington, DE (US)

(72) Inventors: Xavier De Foy, Kirkland (CA); Shamim Akbar Rahman, Cote St. Luc (CA); Serhad Doken, Chester Springs, CA (US); Milan Patel, Harrow (GB); Osama Lotfallah, San Diego, CA (US); Hang Liu, North Potomac, MD (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/183,308

(22) Filed: Jun. 15, 2016

(65) Prior Publication Data

US 2016/0294941 A1  Oct. 6, 2016

Related U.S. Application Data

(63) Continuation of application No. 14/503,256, filed on Sep. 30, 2014, now Pat. No. 9,398,088, which is a
(Continued)

(51) Int. Cl.
*G06F 15/16* (2006.01)
*H04L 29/08* (2006.01)
*H04L 12/66* (2006.01)

(52) U.S. Cl.
CPC .......... *H04L 67/1093* (2013.01); *H04L 12/66* (2013.01); *H04L 67/1046* (2013.01);
(Continued)

(58) Field of Classification Search
CPC ... H04L 67/104; H04L 67/06; H04L 67/1063; H04L 67/1046; H04L 67/1072;
(Continued)

(56) References Cited

U.S. PATENT DOCUMENTS 7,010,578 B1 * 3/2006 Lewin ............... G06F 17/30905
707/E17.121
8,280,846 B2  10/2012 Fox
(Continued)

OTHER PUBLICATIONS

Zong et al., "P2P Streaming Protocol (PPSP) Requirements draft-ietf-ppsp-reqs-02," Feb. 2011, Internet Engineering Task Force (IETF), https://tools.ietf.org/html/draft-ietf-ppsp-reqs-02.*
(Continued)

*Primary Examiner* — Ruolei Zong
(74) *Attorney, Agent, or Firm* — Invention Mine LLC

(57) ABSTRACT

Disclosed herein are methods and systems for integrating peer-to-peer (P2P) networks with content delivery networks (CDNs). In an embodiment, a method for use in a network storage control peer (NSCP) supporting P2P operation includes receiving swarm stats from a tracker; determining, based on the received swarm stats, a P2P rarity associated with a content piece; and responsive to the determined P2P rarity, transmitting an upload request message to an ingestion gateway, wherein the upload request message indicates that the content piece is to be uploaded to a CDN.

20 Claims, 14 Drawing Sheets

Related U.S. Application Data continuation of application No. 13/490,045, filed on Jun. 6, 2012, now Pat. No. 8,880,603.

(60) Provisional application No. 61/494,283, filed on Jun. 7, 2011.

(52) U.S. Cl.
CPC ...... *H04L 67/1063* (2013.01); *H04L 67/1091* (2013.01); *H04L 67/14* (2013.01); *H04L 67/2852* (2013.01)

(58) Field of Classification Search
CPC . H04L 67/1093; H04L 12/66; H04L 67/1091; H04L 67/14; H04L 67/2852
USPC ................ 709/204, 205–207, 217–219, 231
See application file for complete search history.

(56) References Cited

U.S. PATENT DOCUMENTS

| | | | |
|---|---|---|---|
| 8,332,484 B2 | 12/2012 | Afergan | |
| 2006/0200736 A1* | 9/2006 | Smit | |
| 2008/0155061 A1* | 6/2008 | Afergan | H04L 29/08576 709/218 |
| 2009/0083148 A1* | 3/2009 | Hwang | G06Q 30/00 705/14.1 |
| 2009/0100128 A1 | 4/2009 | Czechowski | |
| 2009/0259710 A1 | 10/2009 | Porio | |
| 2010/0011103 A1 | 1/2010 | Luzzatti | |
| 2011/0010421 A1* | 1/2011 | Chavez | H04L 12/6418 709/204 |
| 2011/0107030 A1 | 5/2011 | Borst | |
| 2012/0030316 A1 | 2/2012 | Dougherty | |
| 2012/0221640 A1 | 8/2012 | Cohen | |

OTHER PUBLICATIONS

Androutsellis-Theotokis et al., 'A Survey of Peer-to-Peer Content Distribution Technologies,' ACM Computing Surveys, 36(4):335-371, (Dec. 2004).
Barbir et al., "Known Content Network (CN) Request-Routing Mechanisms," Network Working Group, Request for Comments: 3568 (Jul. 2003).
Cruz et al., "PPSP Tracker Protocol (PPSP-TP)," draft-gu-ppsp-tracker-protocol-07, PPSP Internet-Draft (Feb. 24, 2012).
Day et al., 'A Model for Content Internetworking (CDI),' Network Working Group, Request for Comments: 3466 (Feb. 2003).
Gu et al., 'Peer Protocol,' draft-gu-ppsp-peer-protocol-01, PPSP Internet-Draft (Oct. 25, 2010).
Huang et al., 'Understanding Hybrid CDN-P2P: Why Limelight Needs Its Own Red Swoosh,' International Workshop on Network and Operating Systems Support for Digital Audio Video (2008) available at http://cis.poly.edu/ross/papers/cdn_p2p.pdf (last visited Jun. 26, 2012).
Jennings et al., 'REsource LOcation and Discovery (RELOAD) Base Protocol,' draft-ietf-p2psip-base-13, P2PSIP Internet-Draft (Mar. 14, 2011).
Jiang et al., 'Performance Evaluation of Content Distribution in Hybrid CDN-P2P Network,' 2008 Second International Conference on Future Generation Communication and Networking, vol. 1, ., pp. 188-193, (Dec. 13-15, 2008).
Le et al., "PPSP Usage for DECADE," draft-le-ppsp-decade-interoperation-00, PPSP Internet-Draft (Mar. 7, 2011).
Mattson et al., "HTTP(P2P): A transaction based (HTTP) peer-to-peer protocol for the dissemination of web-objects in congested networks," IEEE International Symposium on Cluster Computing and the Grid, pp. 174-181 (Apr. 2004).
Niven-Jenkins et al., 'Content Distribution Network Interconnection (CDNI) Problem Statement,' draft-jenkins-cdni-problem-statement-02, Network Working Group, Internet-Draft (Mar. 13, 2011).
Pathan et al., 'A Taxonomy and Survey of Content Delivery Networks,' Technical Report, (2007) available at http://www.cloudbus.org/cdn/reports/CDN-Taxonomy.pdf (last visited Jun. 26, 2012).
Rosen et al., 'Peer-to-Peer Session Initiation Protocol (p2psip),' IETF Charter available at http://datatracker.ietf.org/wg/p2psip/charter/ (last visited Jun. 26, 2012).
Stiemerling et al., 'Peer to Peer Streaming Protocol (ppsp),' IETF Charter (May 2011) available at http://tools.ietf.org/wg/ppsp/charters?item=charter-ppsp-2011-05-12txt (last visited Jun. 26, 2012).
Third Generation Partnership Project, "Technical Specification Group Services and System Aspects; Study on IMS based peer-to-peer content distribution services (Release 11)," 3GPP TR 22.906 V11.0.0 (Jun. 2010).
Third Generation Partnership Project, 'Technical Specification Group Services and System Aspects; Feasibility Study on IMS Based Peer-to-Peer Content Distribution Services; Stage 2 (Release 11),' 3GPP TR 23.844 V0.5.0 (Apr. 2012).
Third Generation Partnership Project, "Technical Specification Group Services and System Aspects; Feasibility Study on IMS Based Peer-to-Peer Content Distribution Services; Stage 2 (Release 11)," 3GPP TR 23.844 V0.2.0 (Apr. 2011).
Third Generation Partnership Project, "Technical Specification Group Services and System Aspects; IP Multimedia Subsystem (IMS); Stage 2 (Release 11)," 3GPP TS 23.228 V11.4.0 (Mar. 2012).
Third Generation Partnership Project, "Technical Specification Group Services and System Aspects; IP Multimedia Subsystem (IMS); Stage 2 (Release 7)," 3GPP TS 23.228 V7.16.0 (Dec. 2009).
Third Generation Partnership Project, "Technical Specification Group Services and System Aspects; IP Multimedia Subsystem (IMS); Stage 2 (Release 9)," 3GPP TS 23.228 V9.4.0 (Sep. 2010).
Third Generation Partnership Project, 'Technical Specification Group Services and System Aspects; IP Multimedia Subsystem (IMS); Stage 2 (Release 10),' 3GPP TS 23.228 V10.4.0 (Mar. 2011).
Third Generation Partnership Project, "Technical Specification Group Services and System Aspects; IP Multimedia Subsystem (IMS); Stage 2 (Release 11)," 3GPP TS 23.228 V11.0.0 (Mar. 2011).
Third Generation Partnership Project, "Technical Specification Group Services and System Aspects; IP Multimedia Subsystem (IMS); Stage 2 (Release 8)," 3GPP TS 23.228 V8.12.0 (Mar. 2010).
Third Generation Partnership Project, "Technical Specification Group Services and System Aspects; IP Multimedia Subsystem (IMS); Stage 2 (Release 6)," 3GPP TS 23.228 V6.16.0 (Mar. 2007).
Third Generation Partnership Project, "Technical Specification Group Services and System Aspects; IP Multimedia Subsystem (IMS); Stage 2 (Release 10)," 3GPP TS 23.228 V10.7.0 (Dec. 2011).
Third Generation Partnership Project, 'Technical Specification Group Services and System Aspects; IP Multimedia Subsystem (IMS); Stage 2 (Release 5),' 3GPP TS 23.228 V5.15.0 (Jun. 2006).
TSG SA WG1, 'Proposed new WID on Study on IMS based Peer-to-Peer Content Distribution Services (based on S1-093263),' 3GPP TSG SA Plenary Meeting #45, SP-090491 (Sep. 21-24, 2009).
Van Halderen et al., 'Globule User Manual,' Version 1.3.1 available at http://www.globule.org/docs/ (last visited Jun. 26, 2012).
Wikipedia, "Peer-to-peer," available at http://en.wikipedia.org/wiki/Peer-to-peer (last visited Jun. 26, 2012).
Wu et al., "Survey of P2P File Downloading and Streaming Protocol," draft-wu-ppsp-survey-of-p2p-protocol-00.txt, PPSP Internet Draft (Oct. 18, 2010).
Xiao et al., "A PPSP Tracker Usage for Reload," draft-xiao-ppsp-reload-distributed-tracker-03, PPSP Internet-Draft (Oct. 25, 2011).
Wikipedia, "Session border Controller", available at http://en.wikipedia.org/wiki/Session_border_controller (last visited Jun. 26, 2012).

* cited by examiner

METHODS AND SYSTEMS FOR INTEGRATION OF PEER-TO-PEER (P2P) NETWORKS WITH CONTENT DELIVERY NETWORKS (CDNS)

CROSS REFERENCE TO RELATED APPLICATIONS

This application is a continuation of U.S. patent application Ser. No. 14/503,256, filed Sep. 30, 2014, which is a continuation of U.S. patent application Ser. No. 13/490,045, filed Jun. 6, 2012 and issued Nov. 4, 2014 as U.S. Pat. No. 8,880,603, which claims the benefit of U.S. Provisional Application No. 61/494,283, filed Jun. 7, 2011, all of which are hereby incorporated herein by reference as if fully set forth.

BACKGROUND

Content delivery networks (CDN) may host third party content for fast delivery of static content, streaming media, and other services. Common methods exist for CDNs to perform user redirection. The most common methods may include using special dynamic name servers (DNS), application layer redirection and content modification. For example, content modification may be uniform resource identifier (URI) rewriting. In addition, CDN interconnection (CDNI) for a CDN interworking model may enable request routing to cross CDN boundaries. Existing CDNs may redirect end users towards surrogate servers using DNS based redirection.

There may be two or more ways for a P2P system to interwork with a CDN. One way may include the CDN used as the content source server. In another the CDN edge servers may be enhanced to perform the functionalities of network peers.

SUMMARY

A method and apparatus for use in a network storage control peer (NSCP) supporting peer to peer (P2P) operation are disclosed. The method includes receiving swarm stats from a tracker; determining, based on the received swarm stats, a P2P rarity associated with a content piece; and responsive to the determined P2P rarity, transmitting an upload request message to an ingestion gateway, wherein the upload request message indicates that the content piece is to be uploaded to a content delivery network (CDN).

BRIEF DESCRIPTION OF THE DRAWINGS

A more detailed understanding may be had from the following description, given by way of example in conjunction with the accompanying drawings wherein.

DETAILED DESCRIPTION

Figure 1A:
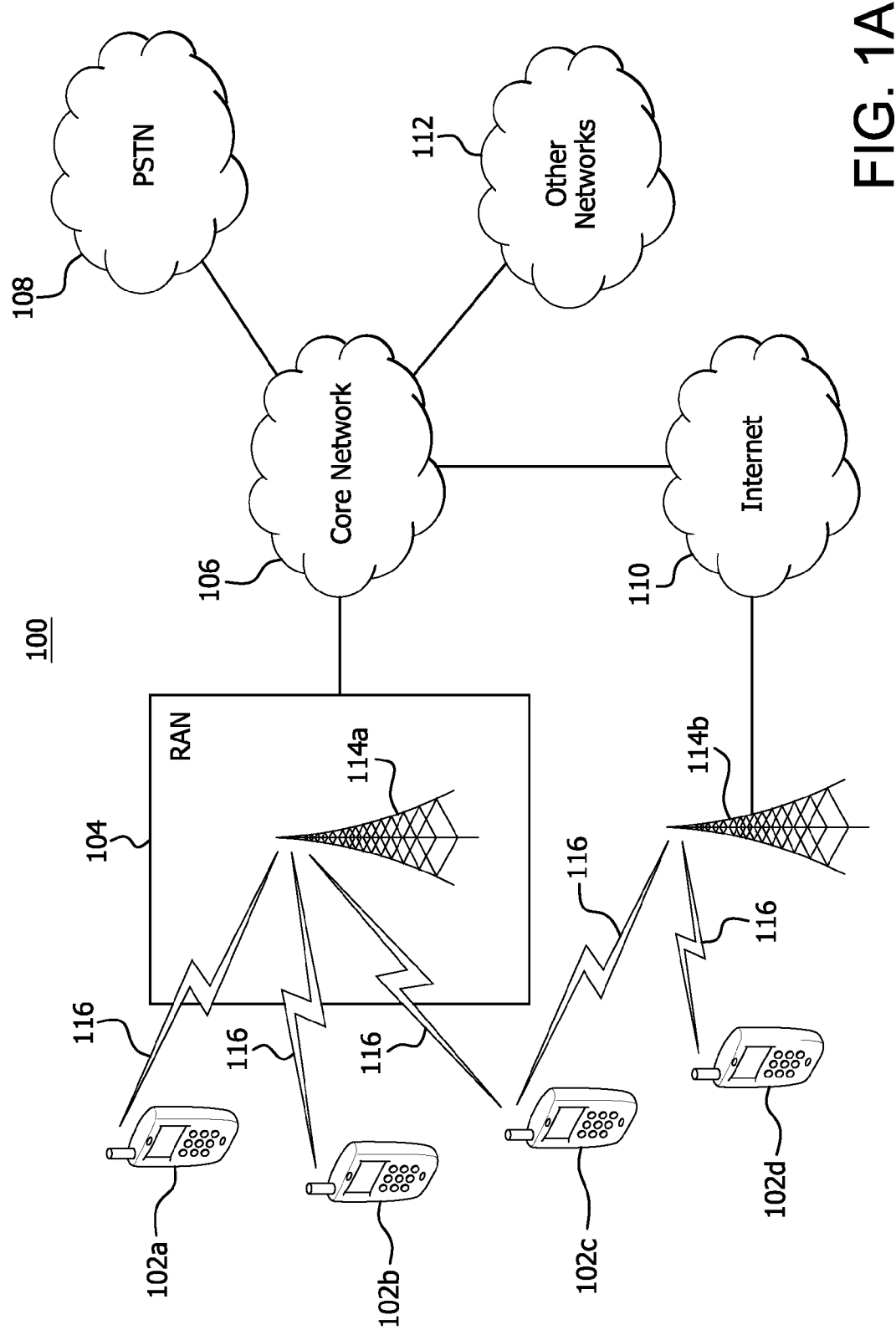
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRUs 102c shown in FIG. 1A may be configured to communicate with the base station 114a, which may employ a cellular-based radio technology, and with the base station 114b, which may employ an IEEE 802 radio technology.

Figure 1B:
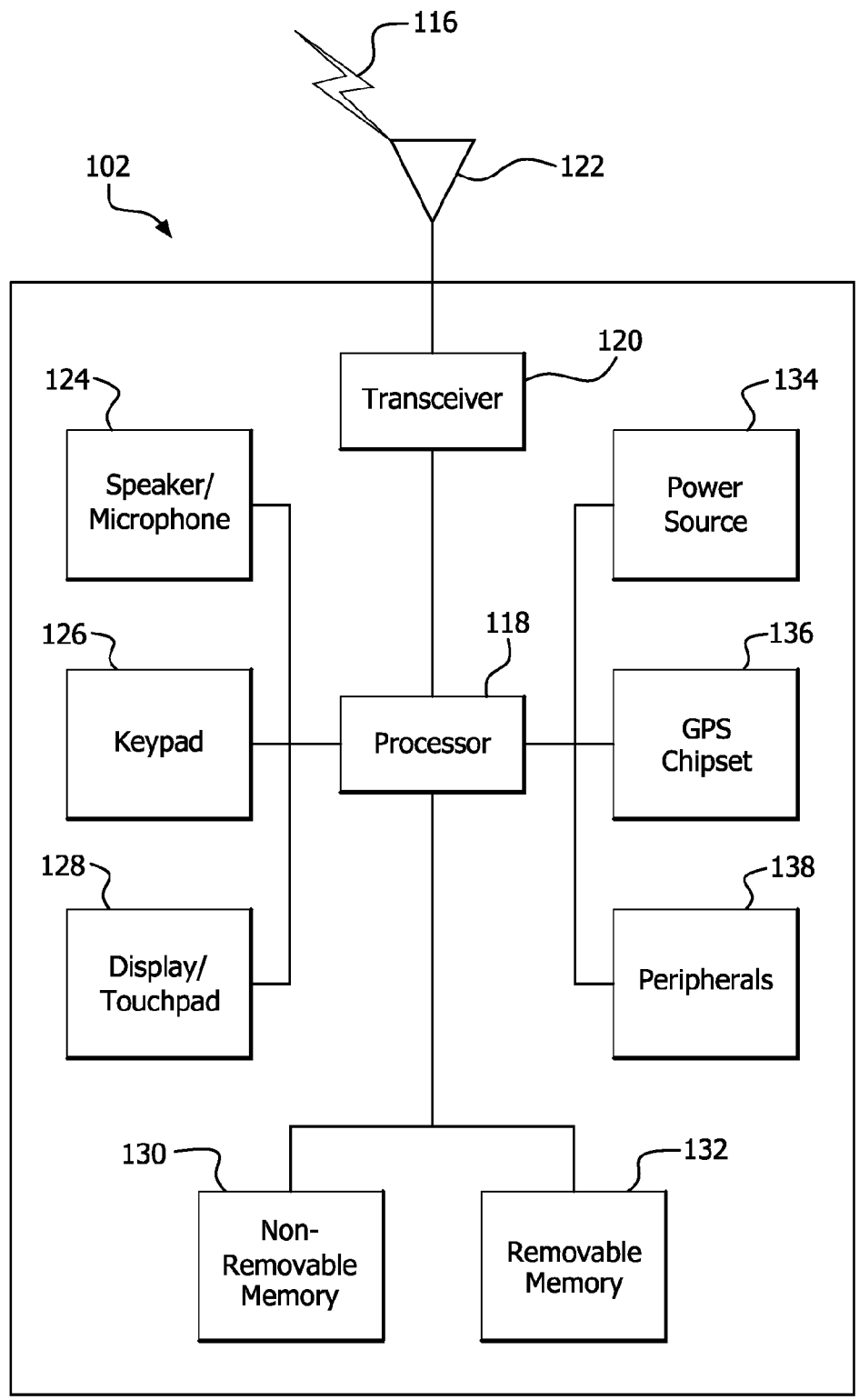
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
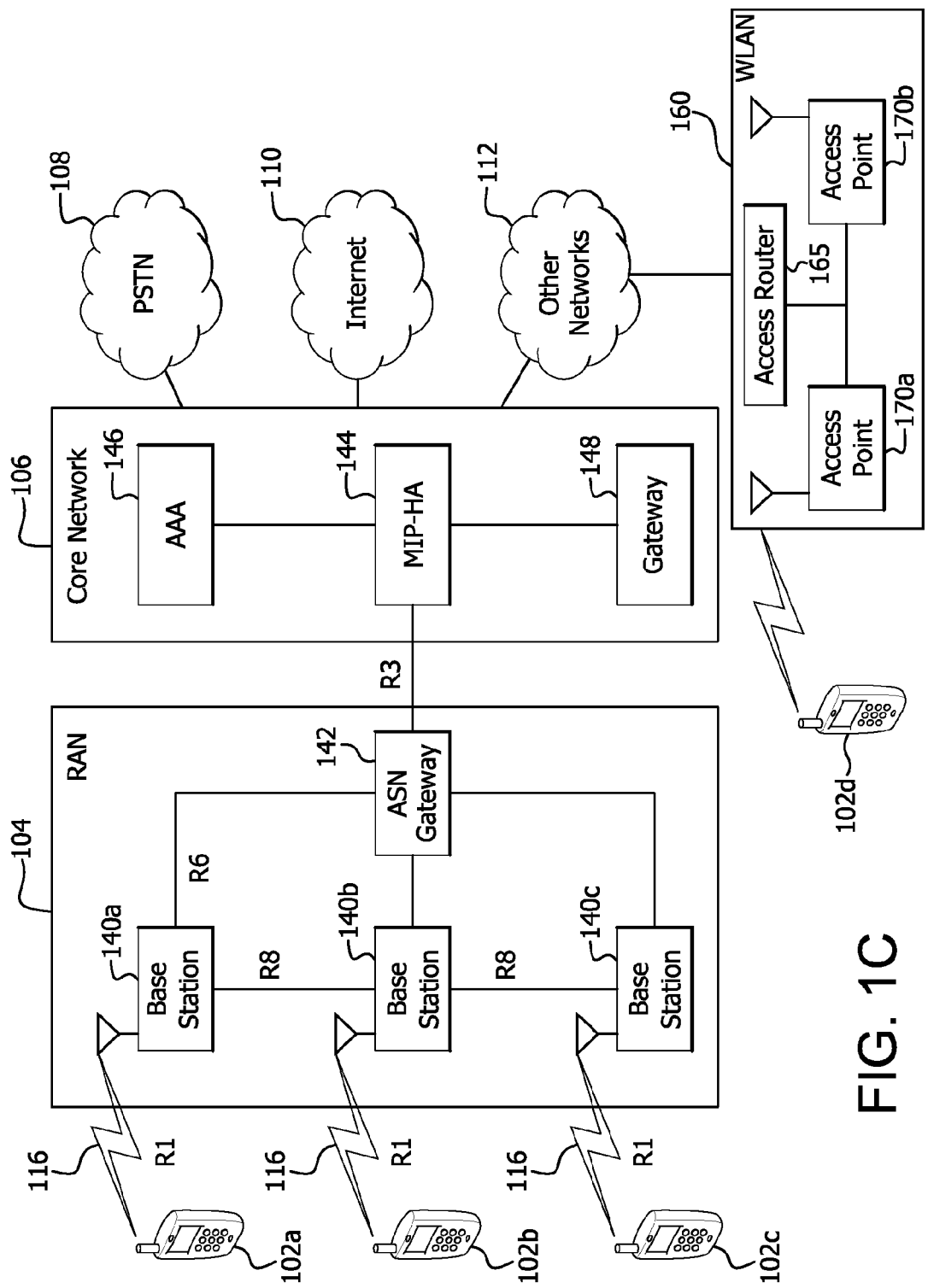
FIG. 1C is a system diagram of an example radio access network and an example core network that may be used within the communications system illustrated in FIG. 1A.

FIG. 1C is a system diagram of the RAN 104 and the core network 106 according to an embodiment. The RAN 104 may be an access service network (ASN) that employs IEEE 802.16 radio technology to communicate with the WTRUs 102a, 102b, 102c over the air interface 116. As will be further discussed below, the communication links between the different functional entities of the WTRUs 102a, 102b, 102c, the RAN 104, and the core network 106 may be defined as reference points.

As shown in FIG. 1C, the RAN 104 may include base stations 140a, 140b, 140c, and an ASN gateway 142, though it will be appreciated that the RAN 104 may include any number of base stations and ASN gateways while remaining consistent with an embodiment. The base stations 140a, 140b, 140c may each be associated with a particular cell (not shown) in the RAN 104 and may each include one or more transceivers for communicating with the WTRUs 102a, 102b, 102c over the air interface 116. In one embodiment, the base stations 140a, 140b, 140c may implement MIMO technology. Thus, the base stations 140a, for example, may use multiple antennas to transmit wireless signals to, and receive wireless signals from, the WTRUs 102a. The base stations 140a, 140b, 140c may also provide mobility management functions, such as handoff triggering, tunnel establishment, radio resource management, traffic classification, quality of service (QoS) policy enforcement, and the like. The ASN gateway 142 may serve as a traffic aggregation point and may be responsible for paging, caching of subscriber profiles, routing to the core network 106, and the like.

The air interface 116 between the WTRUs 102a, 102b, 102c and the RAN 104 may be defined as an R1 reference point that implements the IEEE 802.16 specification. In addition, each of the WTRUs 102a, 102b, 102c may establish a logical interface (not shown) with the core network 106. The logical interface between the WTRUs 102a, 102b, 102c and the core network 106 may be defined as an R2 reference point, which may be used for authentication, authorization, IP host configuration management, and/or mobility management.

The communication link between each of the base stations 140a, 140b, 140c may be defined as an R8 reference point that includes protocols for facilitating WTRU handovers and the transfer of data between base stations. The communication link between the base stations 140a, 140b, 140c and the ASN gateway 215 may be defined as an R6 reference point. The R6 reference point may include protocols for facilitating mobility management based on mobility events associated with each of the WTRUs 102a, 102b, 100c.

As shown in FIG. 1C, the RAN 104 may be connected to the core network 106. The communication link between the RAN 104 and the core network 106 may be defined as an R3 reference point that includes protocols for facilitating data transfer and mobility management capabilities, for example. The core network 106 may include a mobile IP home agent (MIP-HA) 144, an authentication, authorization, accounting (AAA) server 146, and a gateway 148. While each of the foregoing elements are depicted as part of the core network 106, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 144 may provide the WTRUs 102a, 102b, 102c with access to packet-switched networks, such as the Internet 110, to facilitate communications between the WTRUs 102a, 102b, 102c and IP-enabled devices. The AAA server 146 may be responsible for user authentication and for supporting user services. The gateway 148 may facilitate interworking with other networks. For example, the gateway 148 may provide the WTRUs 102a, 102b, 102c with access to circuit-switched networks, such as the PSTN 108, to facilitate communications between the WTRUs 102a, 102b, 102c and traditional land-line communications devices. In addition, the gateway 148 may provide the WTRUs 102a, 102b, 102c with access to the networks 112, which may include other wired or wireless networks that are owned and/or operated by other service providers.

Although not shown in FIG. 1C, it will be appreciated that the RAN 104 may be connected to other ASNs and the core network 106 may be connected to other core networks. The communication link between the RAN 104 the other ASNs may be defined as an R4 reference point, which may include protocols for coordinating the mobility of the WTRUs 102a, 102b, 102c between the RAN 104 and the other ASNs. The communication link between the core network 106 and the other core networks may be defined as an R5 reference, which may include protocols for facilitating interworking between home core networks and visited core networks.

Other network 112 may further be connected to an IEEE 802.11 based wireless local area network (WLAN) 160. The WLAN 160 may include an access router 165. The access router may contain gateway functionality. The access router 165 may be in communication with a plurality of access points (APs) 170a, 170b. The communication between access router 165 and APs 170a, 170b may be via wired Ethernet (IEEE 802.3 standards), or any type of wireless communication protocol. AP 170a is in wireless communication over an air interface with WTRUs 102d. Although the system is described with reference to 802.11, any other wireless communications system may be used. For example, other wireless communications systems may be Global System for Mobile Communications (GSM), Wireless Local Area Network (WLAN), Long Term Evolution (LTE), Wideband Code Division Multiple Access (WCDMA), Universal Mobile Telecommunications System (UMTS), etc.

Figure 2:
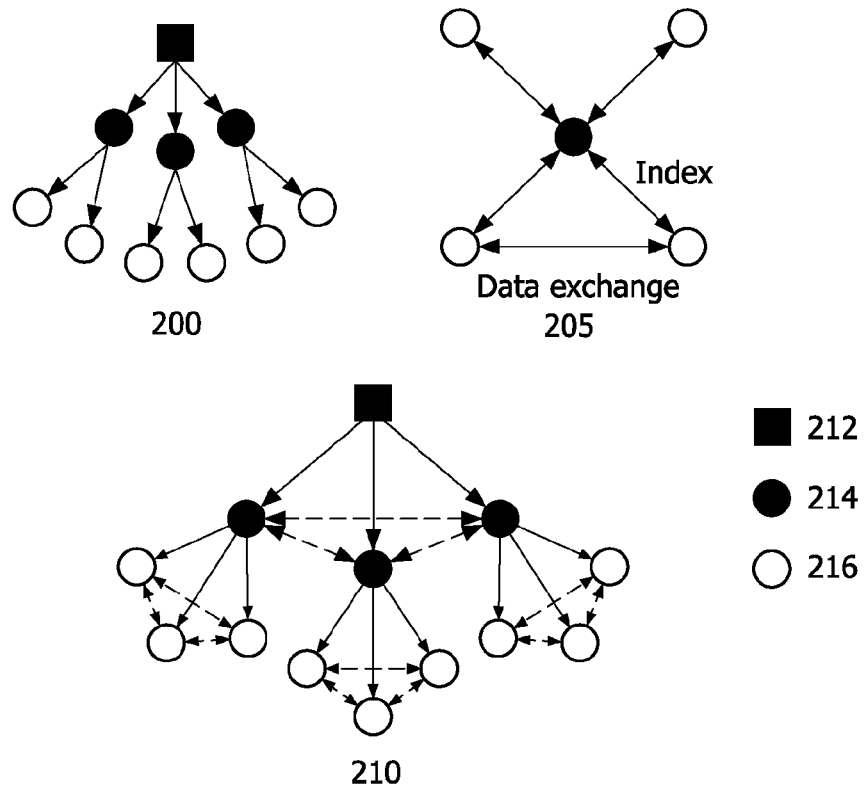
FIG. 2 is an example of hybrid content delivery networks (CDN) (HCDN) systems.

FIG. 2 is an example of hybrid content delivery networks (CDN) (HCDN) systems. FIG. 2 shows three examples of HCDN systems 200, 205, and 210. HCDN system 200 may be a traditional CDN and includes an original server 212, three surrogate or index servers 214, and six users 216. HCDN system 205 may be a centralized P2P and includes a surrogate or index server 214 and four users 216. HCDN system 210 includes an original server 212, three surrogate or index servers 214, and nine users 216.

The HCDN may use a surrogate server as a tracker, which may also be acting as a seed. In one example, a hybrid peer-to-peer CDN model may be used to help reduce the load on CDNs for large-scale distribution of software updates. In another example, CDN distribution may be used to push content to edge servers which may be both P2P index servers and content servers. For example, a P2P index server may be a tracker in peer to peer streaming protocol (PPSP) terminology. In particular, the CDN edge nodes may be involved in the P2P protocol.

There may be two or more ways for a P2P system to interwork with a CDN. One way may include the CDN used as the content source server. In another the CDN edge servers may be enhanced to perform the functionalities of network peers.

Figure 3:
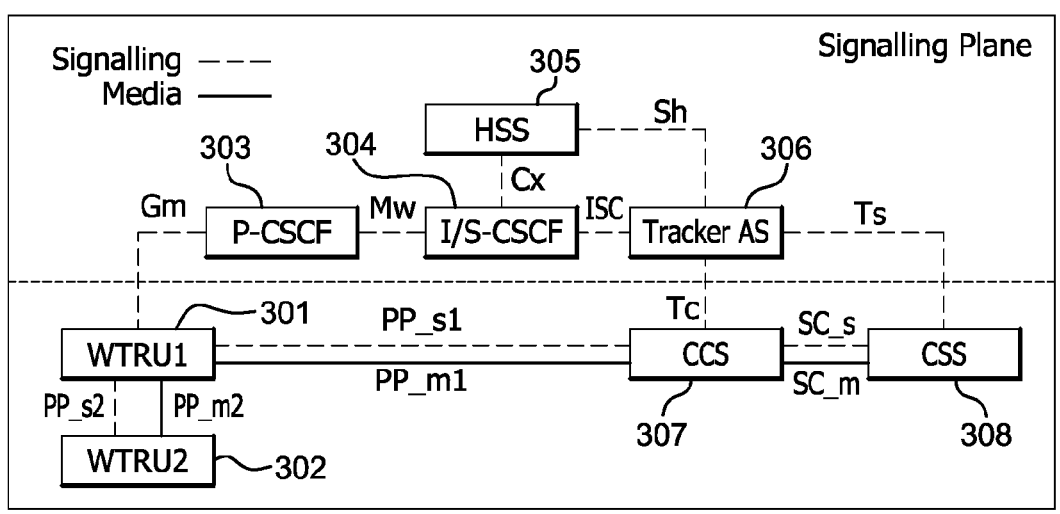
FIG. 3 is an example of internet protocol (IP) multimedia subsystem (IMS) P2P CDN architecture for integration.

FIG. 3 is an example of internet protocol (IP) multimedia subsystem (IMS) P2P CDN architecture for integration. In one example, content piece requests may reach the CDN. FIG. 3 includes the signaling and data or media paths. WTRU1 301 may transmit both signaling and media with WTRU2 302. WTRU1 301 may transmit signaling with a proxy-call state control function (P-CSCF) 303. P-CSCF 303 may transmit signaling with interrogating/serving (I/S) CSCF 304. I/S CSCF 304 may transmit signaling with both Tracker AS 306 and home subscriber server (HSS) 305. HSS 305 may transmit signaling with Tracker AS 306. Track AS 306 may transmit signaling with both Content Source Server (CSS) 307 and CCS 308. WTRU1 301 may transmit signaling and media with CSS 307. CSS 307 may transmit signaling and media with CSS 308.

Figure 4:
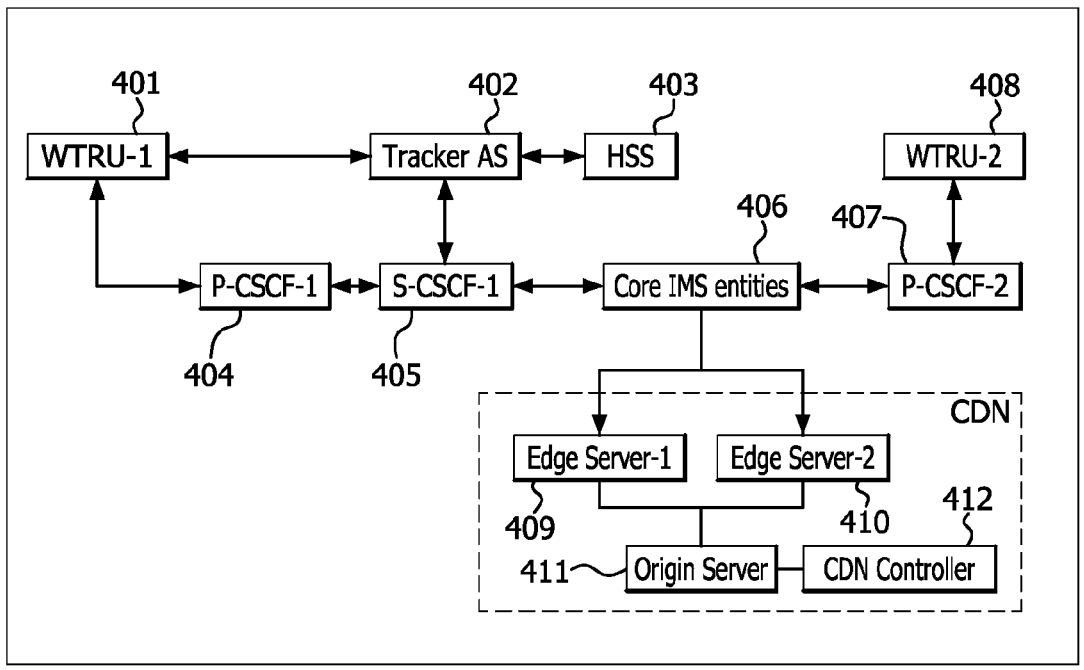
FIG. 4 is an example of a CDN component registered in IMS CDS.
Figure 5:
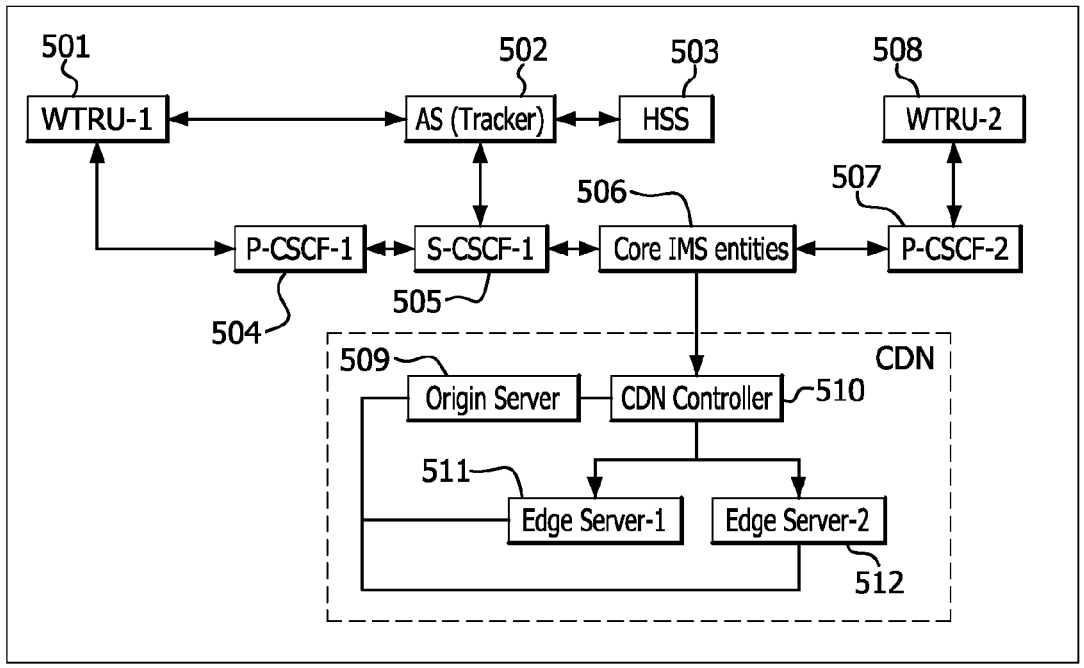
FIG. 5 is an example of a CDN component not registered in IMS CDS.

In one example, the content piece requests may directly reach the edge server, which may be registered in IMS. In another example, the content piece requests may go to a CDN controller, which may be registered in IMS, and may then forward the request internally to the proper surrogate. FIGS. 4 and 5 illustrate both of these examples.

FIG. 4 is an example of a CDN component registered in IMS CDS. WTRU-1 401 may transmit a request for a peer list to Tracker AS 402. Tracker AS 402 may then transmit a peer list to WTRU-1 401 in response to the request. WTRU-1 may transmit a request for a $1^{st}$ piece @edge server-1 409, a $2^{nd}$ piece @edge server-2 410, and a $3^{rd}$ piece @WTRU-2 408 to proxy call state control function-1 (P-CSCF-1) 404. The request for the $1^{st}$, $2^{nd}$, and $3^{rd}$ pieces may be forwarded from P-CSCF-1 404 to the core entities 406. Core entities 406 may forward the request for the $3^{rd}$ piece to P-CSCF-2 407, a request for the $1^{st}$ piece to edge server-1 409, and a request for the $2^{nd}$ piece to edge server-2 410. WTRU-1 401 may then transmit an update status report to Tracker AS 402.

FIG. 5 is an example of a CDN component not registered in IMS CDS. WTRU-1 501 may transmit a request for a peer list to AS (Tracker) 502. AS (Tracker) 502 may then transmit a peer list to WTRU-1 501 in response to the request. WTRU-1 may transmit a request for a $1^{st}$ piece @CDN-1, a $2^{nd}$ piece @CDN-2, and a $3^{rd}$ piece @WTRU-2 to P-CSCF 504. The request for the $1^{st}$, $2^{nd}$, and $3^{rd}$ pieces may be forwarded from P-CSCF-1 504 to the core entities 506. Core entities 506 may forward a request for the $3^{rd}$ piece to P-CSCF-2 507 and a request for the $1^{st}$ and $2^{nd}$ piece to CDN controller 510. CDN controller 510 may then forward the request for a $1^{st}$ piece to edge server-1 511 and the request for a $2^{nd}$ piece to edge server-2 512. WTRU-1 501 may then transmit an update status report to AS (Tracker) 502.

Both Bittorent and eMule, which may be associated with PPSP signaling may be performed by the internet engineering task force (IETF) PPSP WG. Using a Bittorent approach may include using a server side active component and processing a uniform resource locator (URL) request using a specially crafted URL. For example, a server side active component may be a personal home page (PHP) script. An example of a URL in the Bittorent enhancement approach may be: http://www.example.com/source1.php?info_hash=[hash]&piece=[piece]{&ranges=[start]-[end]{,[start]-[end]} . . . }). This Bittorent enhancement approach may place hypertext transfer protocol (HTTP) seeding information in the metadata file, which may be a static piece of information obtained prior to joining a P2P swarm. For example, a metadata file may be a torrent file.

A HTTP GET command may be suggested as a Peer-CDN (HTTP) message. The HTTP GET command may be used in relation to the Bittorent enhancement approach in the context of a static seeding using an HTTP server.

An extension of HTTP may be used to transform the client-server protocol into a P2P protocol where the clients may serve content when accessing a crowded web server, and benefit from a 'tit for tat' policy, since a crowded web server may throttle first non-participating clients. For example, the client may be a browser. While HTTP(P2P) may propose an interesting application of P2P to solve a flash crowd problem, HTTP may not be integrated within a full blown P2P protocol. Within the context of a CDN, HTTP(P2P) may be implemented by surrogate servers, which may also occur by using the hybrid CDN model.

The peer-to-peer streaming protocol (PPSP) IETF Working Group may define a peer-to-peer protocol and a peer-to-tracker protocol. In addition DECADE may be integrated with PPSP. Also within the PPSP WG, RELOAD (e.g., itself developed by P2PSIP WG) may have been proposed implementing a distributed tracker. For example, a client may use RELOAD to locate a tracker within the RELOAD tracker overlay, and then may connect to the tracker using the PPSP tracker protocol.

While PPSP may be designed to build a P2P network using a centralized tracker and distributing streaming content, P2P session initiation protocol (P2PSIP) may be designed to build a P2P overlay network. Combinations of CDNs and P2P protocols may be classified in two categories: tight integration and static loose integration.

In tight integration, the CDN edge servers may use a P2P protocol. The CDN mechanisms may be used to push content at the edge, where a P2P protocol may be used to distribute the content. The hybrid CDN is an example of this type of combination.

In static loose integration, the content may be pushed on a CDN, or the content may instead be stored on a single web server without using a CDN. A P2P swarm may then be started, containing information about the location of the pieces as HTTP uniform resource identifiers (URIs). The Bittorent approach may be an example.

In CDN and P2P integration, either loose or tight, the CDN edge servers may obtain the contents through a content acquisition and ingestion procedure from an external source. The CDN edge servers may act as the content sources for the P2P network. The CDN edge servers may not obtain content from peers in the P2P network.

A more dynamic loose integration may be disclosed. This more dynamic loose integration may allow nodes in the P2P network to dynamically advertise content pieces available in the CDN, directly upload content pieces to the CDN, redirect a peer to get content from the CDN, and use the CDN for more efficient content distribution may occur. The content pieces in a dynamic loose integration may be dynamically added to and removed from the CDN, which may not have been done in static loose integration. This may efficiently adapt CDN usage to help content delivery in the P2P network when it is most needed. Any currently deployed CDN may be interworked with any P2P protocol, which may not have been done in tight integration.

A new P2P node using a CDN backend for storage may be introduced. The P2P node may be called a Network Storage Control Peer (NSCP). A NSCP may use P2P protocols to join and participate in the swarm. For example, P2P protocols may be peer-to-tracker and peer-to-peer in PPSP. In one example, PPSP may be chosen as an example of P2P protocol. Other P2P protocols may also be used.

The NSCP advertised content pieces may be stored in the CDN using the peer-to-tracker or the peer-to-peer protocol. Depending on the solution selected, other peers may learn the URIs of the pieces on the CDN directly through the tracker, or through a redirection from the NSCP.

Figure 6:
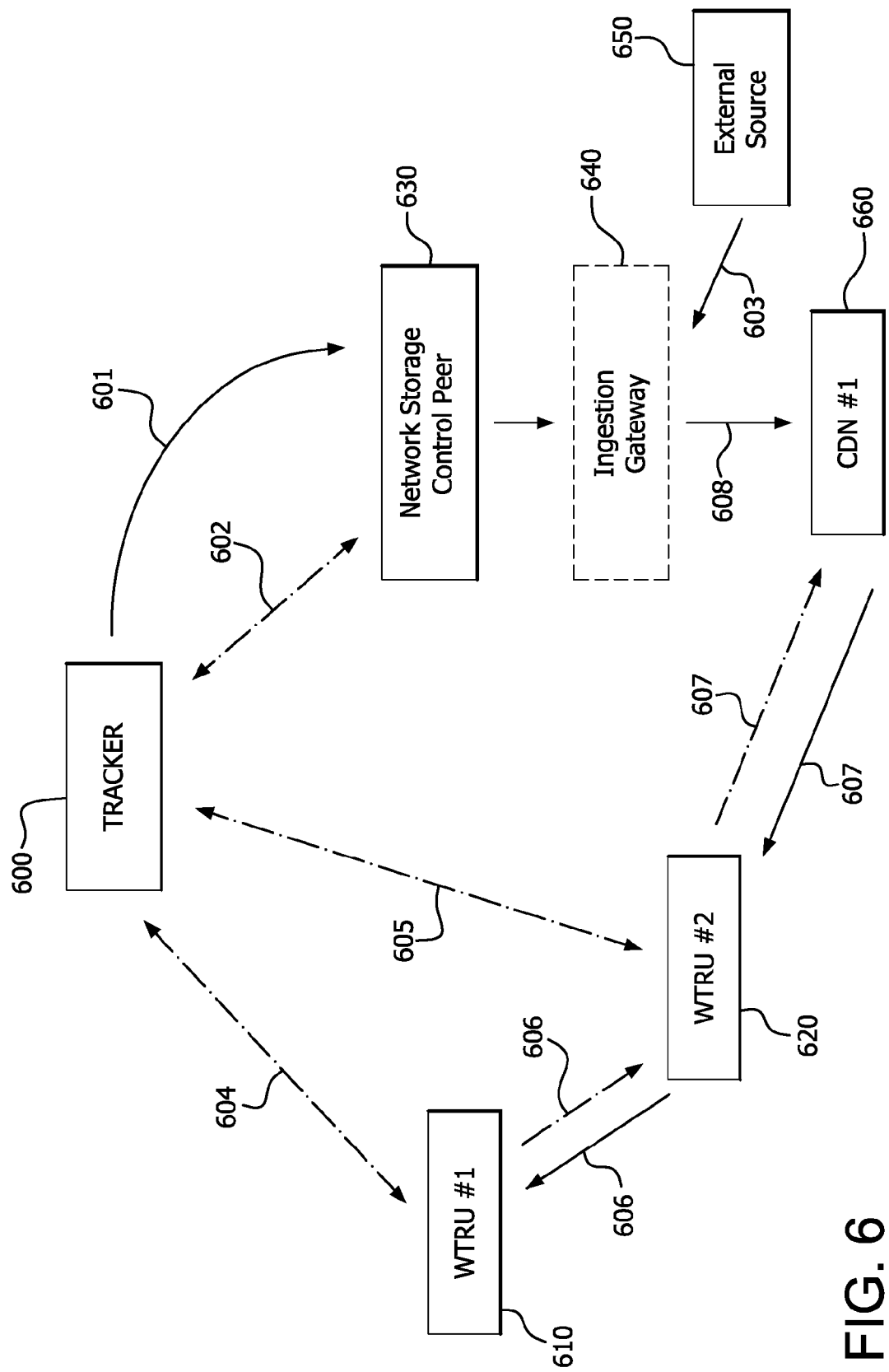
FIG. 6 is an example of a tracker based integration model.

FIG. 6 is an example of a tracker based integration model. Tracker 600 provides information about current swarms to NSCP 630 (601). NSCP 630 joins a swarm and receives a peer list from tracker 600 (602). NSCP 630 provides a list of chunks stored in CDN to tracker 600 (602). Tracker 600 provides stats periodically to NSCP 630 (602). Ingestion gateway 640 downloads content from external source 650 (603). The ingestion gateway function may be external or collocated with NSCP 630.

WTRU-1 610 joins a swarm, receives a peer list from tracker 600, and finds chunks (604). The peer list may include a CDN chunk list. WTRU2-620 joins a swarm, receives a peer list from tracker 600, and finds chunks (605). The peer list may include a CDN chunk list. WTRU-1 610 transmits a GET message to WTRU-2 620 (606). In response to the GET message, WTRU-2 620 transmits a chunk to WTRU-1 610 (606). WTRU-2 620 transmits a GET message to CDN 660 (607). In response to the GET message, CDN 660 transmits an HTTP GET chunk to WTRU-2 620 (607). The NSCP 630 may interface with more than one CDN. CDN 660 ingests content from ingestion gateway 640 (608). The tracker 600 may communicate using peer-to-tracker protocol. WTRU-1 610 may communicate with WTRU-2 620 using peer-to-peer protocol.

The NSCP may be used to initially seed a swarm, or it may be used to boost an existing swarm. The tracker may provide the NSCP with a list of swarms to join and additional swarm information, using the tracker protocol or another protocol, such as a web service or SIP. An example of additional swarm information may include the content source location URIs, and whether the NSCP may be the primary seed of the swarm. The NSCP may use the peer-to-tracker protocol to join a swarm.

The tracker may implement an optional access control for NSCP, to prevent issues such as peers using third party resources in an unauthorized fashion. For example, the NSCP may be provisioned with a peer ID and a certificate including a property granting NSCP status. Upon receipt of the certificate from the NSCP, the tracker may accept the NSCP. Other authorization methods may be used instead, including NSCP peer ID provisioning in the tracker.

On a regular basis or on-demand, the tracker may provide swarm statistics to the NSCP. For example, swarm statistics may be peer population level or how many pieces are popular/unpopular/not present. The NSCP may use this information to decide to upload rare pieces to the CDN, or delete popular pieces from the CDN. Other algorithms may be used to decide which piece to upload or delete.

In an example, the NSCP may use a CDN-based storage backend accessible by peers using HTTP. However, another network storage technology may also be used. IETF protocols DECADE and WebDAV may also be used. The NSCP may be implemented with a non-CDN backend. For example, the NSCP may use a third party DECADE or WebDAV account to externalize the storage and may eliminate the burden and risk of maintaining large storage nodes. In another example, the NSCP may use a cloud storage service, or virtualization service, using a web service interface to upload and delete the pieces. For example, the web service interface may be SOAP or REST interface. The pieces may be retrieved by peers using, for example, HTTP GET or simple object access protocol (SOAP) requests.

The NSCP may also use its own storage as a normal peer. In this hybrid example, the NSCP may interact with the system as a normal peer for all content it stores locally, and as an NSCP for content stored in a CDN. For example, this hybrid example may be used to supplement a regular P2P seed with additional flexible storage capacity provided by a CDN or other remote storage backend.

Whenever the NSCP may need to put or delete a piece from a CDN, the NSCP may use the CDN ingestion interface either directly or through a gateway. Using a gateway may be useful to adapt to changing CDNs, since CDNs may provide their own proprietary ingestion interfaces. Using the gateway may also be useful to adapt to multiple CDNs used in parallel. Alternatively, the NSCP (or gateway) may use a standard compliant protocol to interface with the CDN. Such a protocol may be provided by the CDN interconnection (CDNI) IETF working group. In particular, the CDNI metadata application programming interface (API) and the acquisition API may be used together to implement an interface in a standard compliant fashion, without requiring additional features from a CDNI compliant CDN. A gateway may be useful to insulate the NSCP from the identity and multiplicity of CDNs used. The protocol between NSCP and the CDN ingestion gateway may be a new standard interface, such as an HTTP based RESTful interface, or may be based on the CDNI metadata and acquisition APIs.

Figure 7:
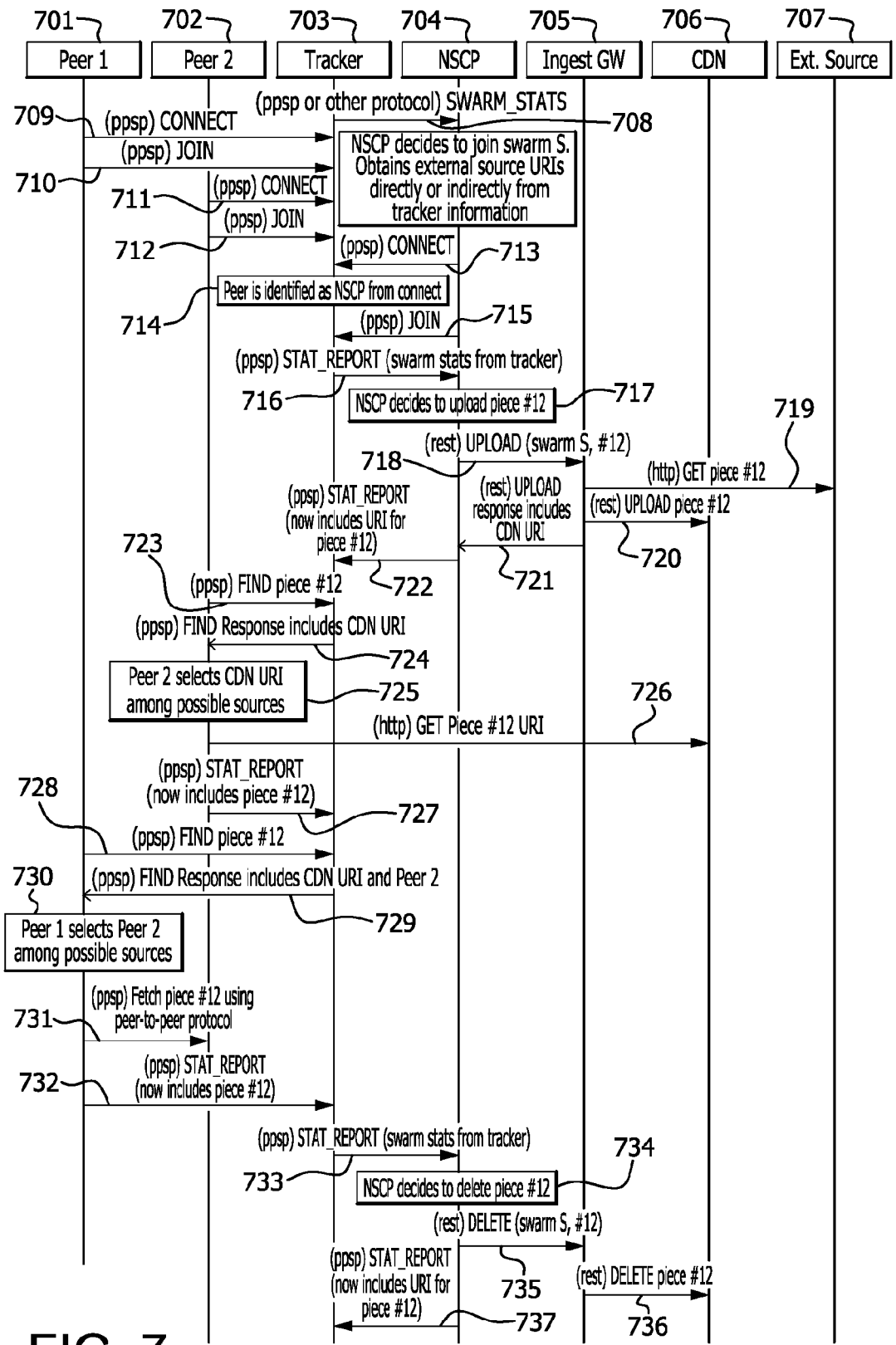
FIG. 7 is an example tracker based integration model message flow.

FIGS. 6 and 7 show a "push"-type ingestion where the external content may be uploaded from the gateway to the CDN. Alternatively a "Pull"-type ingestion may also be used, for example, when using CDNI acquisition. In a pull example, the CDN may directly obtain the content from the content source, based on information provided by the gateway. The NCSP may also obtain pieces from other P2P peers using the P2P protocol, and then "push" these pieces to the CDN, through the gateway.

As part of the initial signaling process with the tracker, the NSCP may advertise itself as an HTTP based NSCP. For example, the initial signaling process with the tracker may be in the PPSP peer-to-tracker CONNECT message. The NSCP may also advertise to the tracker which content pieces are stored in the CDN and the URIs where they may be retrieved. For example, the URIs may be retrieved in a PPSP STAT_REPORT message to the tracker.

When other peers in the swarm query the tracker for a peer list, the tracker response may include CDN URIs along with a list of regular peers. The peers may not retrieve a content bitmap from the NSCP. For example, a content bit map may be a bitmap indicating which piece is held by a peer. The peers may retrieve CDN URIs only from the tracker. Whether a piece is retrieved in priority from a CDN or from a regular peer is a policy decision which may be taken in the client, in the tracker, or both. For example, if the policy decision is taken in the tracker, this may be done by the tracker selectively providing CDN URIs.

Peer authentication or authorization information may be added in various messages. For example, peer authentication or authorization may result in peers using an HTTP authentication method to retrieve a content piece, using a token obtained from the tracker. The token may have been originally provided to the tracker by NSCP.

FIG. 7 is an example tracker based integration model message flow. FIG. 7 describes an example of message flow when in use with PPSP as the P2P protocol. Messages to or from the tracker may be peer-to-tracker messages. The STAT_REPORT message may be a new extension to have the tracker report statistics to a peer instead of the opposite. The SWARM_STATS may be added in the PPSP tracker protocol to provide the swarm list and related information to the NSCP. Response messages may be omitted, unless they carry important information. Protocols may be indicated between parentheses. The term "rest" may be used to denote a RESTful HTTP based interface, for example, CDNI or proprietary, but other protocols may be used as well.

Tracker 703 transmits SWARM_STATS to NSCP 704 using PPSP or another protocol (708). Peer-1 701 transmits a PPSP CONNECT message to tracker 703 (709). Peer-1 701 transmits a PPSP JOIN message to tracker 703 (710). The NSCP 704 may decide to join swarm S, for example, and may obtain external source URIs directly or indirectly from the tracker information. Peer-2 702 transmits a PPSP CONNECT message to tracker 703 (711). Peer-2 702 transmits a PPSP JOIN message to tracker 703 (712). NSCP 704 transmits a PPSP CONNECT message to tracker 703 (713). Tracker 703 identifies a peer as NSCP from the received CONNECT message (714). NSCP 704 transmits a PPSP JOIN message to tracker 703 (715). Tracker 703 transmits a PPSP STAT_REPORT message to NSCP 704, including swarm stats from tracker (716).

NSCP 704 decides to upload piece #12 (717). NSCP 704 transmits a REST UPLOAD message to ingest gateway 705, including swarm S and piece #12 (718) Ingest gateway 705 transmits an HTTP GET piece #12 message to external source 707 (719). Ingest gateway 705 transmits a REST UPLOAD piece #12 message to CDN 706 (720). Ingest gateway 705 transmits a REST UPLOAD response to NSCP 704, including a CDN URI (721). NSCP 704 transmits a PPSP STAT_REPORT to tracker 703, including URI for piece #12 (722). Peer-2 702 transmits a PPSP FIND piece #12 message to tracker 703 (723). Tracker 703 transmits a PPSP FIND response to peer-2 702, including CDN URI (724). Peer-2 702 selects CDN URI among possible sources (725).

Peer-2 702 transmits an HTTP GET piece #12 URI to CDN 706 (726). Peer-2 702 transmits a PPSP STAT_REPORT to tracker 703, including piece #12 (727). Peer-1 701 transmits a PPSP FIND piece #12 message to tracker 703 (728). Tracker 703 transmits PPSP FIND response to peer-1 701, including CDN URI and peer-2 (729). Peer-1 701 selects peer-2 among possible sources (730). Peer-1 701 transmits a PPSP Fetch piece #12 message to peer-2 702 using peer-to-tracker protocol (731). Peer-1 701 transmits a PPSP STAT_REPORT to tracker 703, including piece #12 (732).

Tracker 703 transmits a PPSP STAT_REPORT to NSCP 704, including swarm stats from tracker (733). NSCP 704 deletes piece #12 (734). NSCP 704 transmits a REST DELETE message to ingest gateway 705, including swarm S and piece #12 (735). Ingest gateway 705 transmits a REST DELETE piece #12 message to CDN 706 (736). NSCP 704 transmits a PPSP STAT_REPORT to tracker 703, including URI for piece #12 (737).

Figure 8:
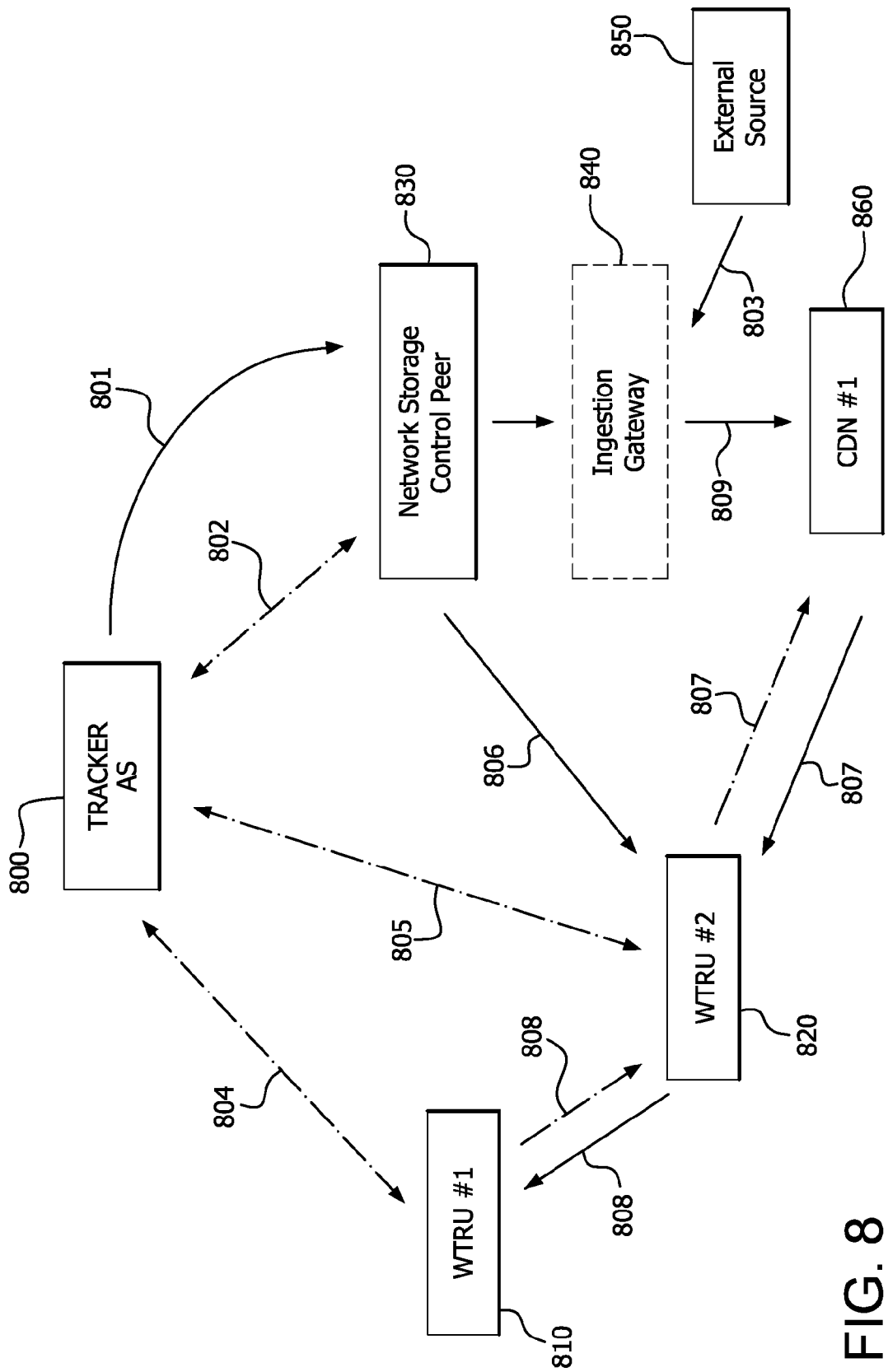
FIG. 8 is an example of a peer based integration model.

FIG. 8 is an example of a peer based integration model. Tracker AS 800 provides information about current swarms to a NSCP 830 (801). NSCP 830 joins a swarm and receives a peer list from tracker AS 800 (802). NSCP 830 announces a Network Storage Type to tracker AS 800 (802). Tracker AS 800 provides stats periodically to NSCP 830 (802). Ingestion gateway 840 downloads content from external source 850 (803). The ingestion gateway function may be external or collocated with NSCP 830.

WTRU-1 810 joins a swarm, receives a peer list from tracker 800, and finds chunks (804). Peers in the peer list may be associated with Network Storage Type. WTRU2-820 joins a swarm, receives a peer list from tracker 800, and finds chunks (805). Peers in the peer list may be associated with Network Storage Type. NSCP 830 transmits a reference to CDN chunk to WTRU-2820.

WTRU-2 820 transmits a GET message to CDN 860 (807). In response to the GET message, CDN 860 transmits an HTTP GET chunk to WTRU-2 820 (807). WTRU-1 810 transmits a GET message to WTRU-2 820 (808). In response to the GET message, WTRU-2 820 transmits chunk to WTRU-1 810 (808). The NSCP 830 may interface with more than one CDN 860. CDN 860 ingests content from ingestion gateway 840 (809). The tracker 800 may communicate using peer-to-tracker protocol. WTRU-1 810 and NSCP 830 may communicate with WTRU-2 820 using peer-to-peer protocol.

As part of the joining process, the NSCP may advertise itself as an HTTP based NSCP. For example, the joining process may be in the PPSP peer-to-tracker CONNECT message. The NSCP may not advertise to the tracker which content pieces are stored in the CDN and where the URIs may be retrieved. When the tracker includes the NSCP in a peer list, the tracker may mention that the NSCP is a CDN based peer. For example, the tracker may include the NSCP in a peer list in a FIND response to a peer. For example, the tracker may mention that the NSCP is a CDN based peer by using a network storage type parameter and setting its value to HTTP. This information may be used by peers to influence their choice when selecting a peer.

The NSCP may contact the tracker as a regular peer. In this example, the tracker may not be able to associate a Network Storage Type associated with the NSCP in the peer lists provided to other peers. This limitation may be desirable because it may naturally limit the NSCP usage to a fraction of the peers. In another example, the NSCP may advertise its network storage type to the tracker, and the tracker may not include this information in the peer list.

Peers may obtain a content bitmap from the NSCP directly using a peer-to-peer protocol. The bitmap may indicate which content pieces are available from the NSCP. When a peer uses a peer-to-peer message to get a given content piece from the NSCP, the NSCP may reply with a redirection towards the URI of the piece stored on the CDN, instead of replying with the content piece itself. The requesting peer may use HTTP to retrieve the piece from the CDN.

In an access control scheme, the tracker may accept only an authenticated NSCP in the swarm and peers may accept redirections to URIs only from nodes that were advertised as NSCP by the tracker. This may eliminate the risk of a regular peer abusing a "tit for tat" reward system commonly implemented in P2P peers, or using third party resources in an unauthorized fashion.

Figure 9:
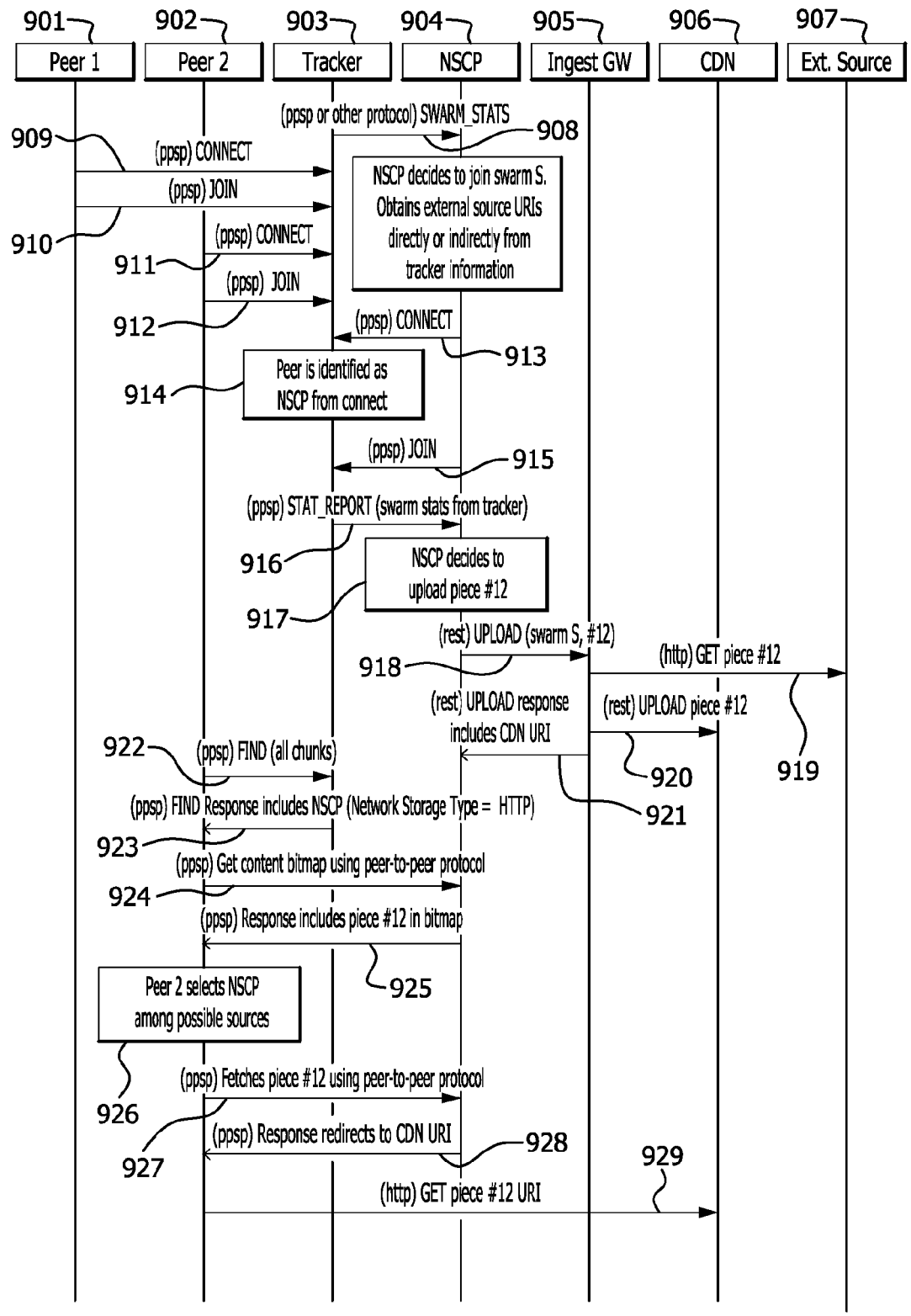
FIG. 9 is an example of a peer based integration model message flow.

FIG. 9 is an example of a peer based integration model message flow. FIG. 9 describes an example of message flow when the invention is in use with PPSP as the P2P protocol. Messages to or from the tracker may be peer-to-tracker messages. The STAT_REPORT message may be a new extension to have the tracker report statistics to a peer instead of the opposite. The SWARM_STATS may be added in the PPSP tracker protocol to provide the swarm list and related information to the NSCP. Response messages may be omitted, unless they carry important information. Protocols may be indicated between parentheses. The term "rest" may be used to denote a RESTful HTTP based interface, for example, CDNI or proprietary, but other protocols may be used as well.

Tracker 903 transmits SWARM_STATS to NSCP 704 using PPSP or another protocol (908). Peer-1 901 transmits a PPSP CONNECT message to tracker 903 (909). Peer-1 901 transmits a PPSP JOIN message to tracker 903 (910). The NSCP 904 may decide to join swarm S, for example, and may obtain external source URIs directly or indirectly from the tracker information. Peer-2 902 transmits a PPSP CONNECT message to tracker 903 (911). Peer-2 902 transmits a PPSP JOIN message to tracker 903 (912). NSCP 904 transmits a PPSP CONNECT message to tracker 903 (913). Tracker 903 identifies a peer as NSCP from the received CONNECT message (914). NSCP 904 transmits a PPSP JOIN message to tracker 903 (915). Tracker 903 transmits a PPSP STAT_REPORT message to NSCP 904, including swarm stats from tracker (916).

NSCP 904 decides to upload piece #12 (917). NSCP 904 transmits a REST UPLOAD message to ingest gateway 905, including swarm S and piece #12 (918) Ingest gateway 905 transmits an HTTP GET piece #12 message to external source 907 (919). Ingest gateway 905 transmits a REST UPLOAD piece #12 message to CDN 906 (920). Ingest gateway 905 transmits a REST UPLOAD response to NSCP 904, including a CDN URI (921). Peer-2 902 transmits a PPSP FIND piece #12 message to tracker 903 (922). Tracker 903 transmits a PPSP FIND response to peer-2 902, including NSCP (923). NSCP may include an HTTP Network Storage Type.

Peer-2 902 transmits a PPSP get content bitmap message using peer-to-peer protocol to NSCP 904 (924). NSCP 904 transmits a PPSP response including piece #12 in bitmap (925). Peer-2 902 selects NSCP among possible sources (926). Peer-2 902 transmits a PPSP fetch pieces #12 message using peer-to-peer protocol to NSCP 904 (927). NSCP 904 transmits a PPSP response, redirecting to CDN URI, to peer-2 902 (928). Peer-2 902 transmits an HTTP GET piece #12 URI to CDN 906 (929).

Mechanisms may exist to prohibit the misuse of the CDN account managed by the NSCP. For example, if all peers are programmed to use NSCP in priority, the P2P swarm may become centralized as the NSCP becomes known by more peers. On the other hand, if peers are programmed to obtain pieces from regular peers in priority, the effect of CDN seeding may be very limited. This may be similar to problems faced by P2P streaming systems, to balance usage of the cache servers seeding P2P swarms. For example, using P2P traffic to offload cache servers, while at the same time using cache servers as needed to maintain the necessary throughput to peers.

In addition to algorithms implemented in P2P systems, the NSCP may be able to upload and delete pieces to/from the network storage, based on the swarm information provided by the tracker. For example, if a piece becomes popular, its presence on the CDN may not be necessary any longer and it may be removed. In another example, if the CDN seeding no longer contributes to the swarm after 1 hour, an uploaded piece may be associated with a lifetime of 1 hour, after which the CDN may delete it and the NSCP may remove it from its content bitmap.

The NSCP, together with the gateway, may aim at globally optimizing its contribution to all swarms while staying within a given budget in terms of storage space and bandwidth utilization. If the CDN account maintained by the NSCP is full, the NSCP may make the decision to delete a piece of content from swarm S1 from the CDN, because the NSCP may judge that a new piece will contribute more to swarm S2. In another example, the NSCP may delete a piece because a swarm is overusing it, in order to limit the CDN bandwidth contribution to a particular swarm. Examples of parameters the NSCP may use to ensure fairness between swarms within CDN account constraints include but are not limited to per-swarm soft or hard limits on CDN bandwidth, storage space and quality of experience (QoE). For example, QoE may be average playback buffer size, number and length of buffer starvations.

In another example an update to the IMS P2P content delivery system architecture is made to integrate CDN in a dynamic fashion into the swarm. This may include a new type of Content Cache Server (CCS) function, which may be called a CDN based Content Cache Server (CDN based CCS). The CDN based CCS may comprise three sub-functions which may include but are not limited to the NSCP, an unmodified third party CDN and a gateway in between. Interfaces may be introduced or extended to support the new CDN based CCS. There may not be a modification for the CDN.

Figure 10:
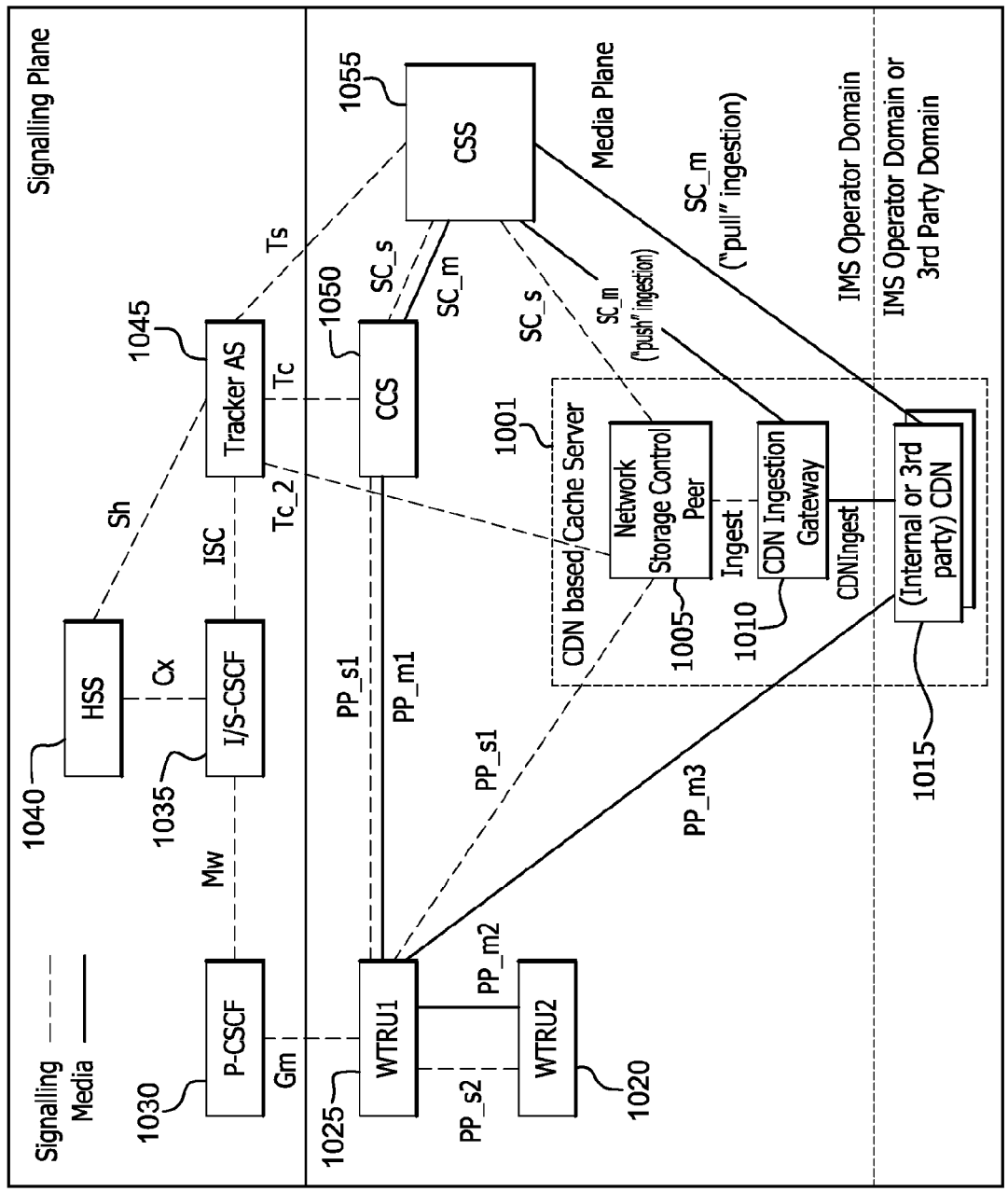
FIG. 10 is an example of an updated IMS P2P CDS architecture.

FIG. 10 is an example of an updated IMS P2P CDS architecture. A CDN based Content Cache Server (CDN based CCS) may provide a function similar to the Content Cache Server (CCS). For example, the CDN based CSS may be used to seed a P2P delivery of a stream, using content obtained from the Content Source Server (CSS). As an alternative to CCS, which may provide locally stored content pieces to other peers using the P2P protocol, the CDN based CCS may store content pieces in a CDN, and use the P2P protocol only to disseminate pieces locations. A CDN based CCS may be used as a normal CCS, fully seeding a swarm from the beginning, or as a complementary cache, used to boost existing swarms when needed. A CDN based CCS function may be composed of a Network Storage Control Peer, a CDN Ingestion Gateway and a CDN.

CDN based cache server 1001 may include NSCP 1005, CDN Ingestion Gateway 1010 and Internal or 3rd Party CDN 1015. NSCP 1005 may transmit signaling with WTRU1 1025, Tracker AS 1045, CSS 1055, and CDN Ingestion Gateway 1010. CDN Ingestion Gateway 1010 may transmit media with both CSS 1055 and Internal or 3rd Party CSN 1015. Internal or 3rd Party CDN 1015 may transmit media with both WTRU1 1025 and CSS 1055. WTRU1 1025 may transmit media and signaling with WTRU2 1020. WTRU may transmit signaling with P-CSCF 1030. P-CSCF 1030 may transmit signaling with I/S CSCF 1035. I/S CSCF 1035 may transmit signaling with both HSS 1040 and Tracker AS 1045. HSS 1040 may transmit signaling with Tracker AS 1045. Tracker AS 1045 may transmit signaling with both CSS 1050 and CSS 1055. WTRU1 1025 may transmit both media and signaling with CSS 1050. CSS 1050 may transmit both media and signaling with CSS 1055.

For a Network Storage Control Peer function, the tracker protocol may be extended to support the additional functionality. For example, the Network Storage Control function may include a new message SWARM_STATS, the extension of a STAT_REPORT message transmitted from tracker to peer, and the extension of a FIND message to support storage type information. Interface Tc_2 may represent this extended interface in FIG. 10.

A CDN Ingestion Gateway may translate between a common ingestion interface (Ingest) and an ingestion interface provided by third party CDN operators (CDNIngest). For example, if the NSCP determines to upload a particular piece of content, the gateway may obtain it from CSS using SC_m, or from the NSCP over an Ingest interface, and may upload it to a third party CDN using an HTTP PUT or POST command. This may be a "push" over a proprietary API. In another example, the NSCP may determine to upload a piece of content. The gateway may provide the content URI to the CDN, which may obtain it using an HTTP GET. This may be a "pull" over a CDNI acquisition interface. Content pieces uploaded to the CDN may be received from a non P2P content source, but may also be received from other peers through the NSCP. For example, a non P2P content source may be a CSS.

The CDN may be located within the IMS operator domain or within a third party domain. The CDN may support the PP_m3 interface, which is typically HTTP, though other protocols such as DECADE and WebDAV may be used. For example, the HTTP may be a GET.

There may be three different deployment options possible. In a first deployment option, the NSCP and CDN Ingestion gateway may be a single node or in two dedicated nodes. This may be similar to a regular CCS, but with only a minimal amount of attached storage capacity.

In a second deployment option, the NSCP, with or without the CDN Ingestion gateway, may be implemented within a regular CCS node. This may be useful to augment a regular CCS "on-demand." For example, in peak hours the CCS may be able to use a CDN to complement its own storage capacity.

In a third deployment option, a CDN Ingestion Gateway, with or without the NSCP, may be implemented within a Session Border Controller (SBC) node. An example of SBC may be the IMS Border Control Function, composed of Interconnect Border Control Function (IBCF) on the signaling plane and Translation Gateway (TrGW) on the media plane. For example, the CDN Ingestion Gateway may be located in the TrGW, and the NSCP may be located in the TrGW, IBCF or a distributed between both.

There may be other options to deploy NSCP, including within a Media Resource Function (MRF) or as an application server.

Figure 11:
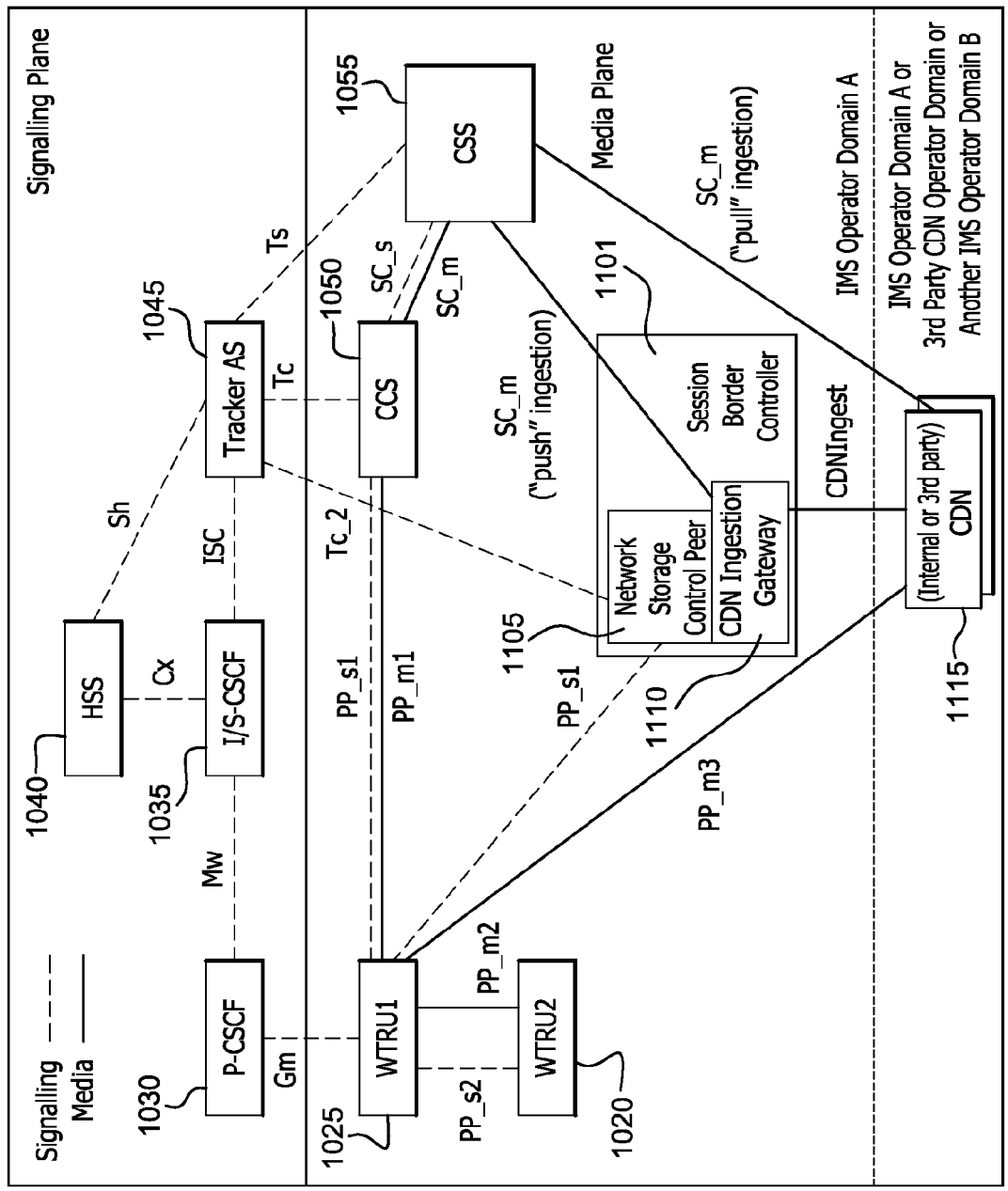
FIG. 11 is an example of a deployment option using SBC.
Figure 12:
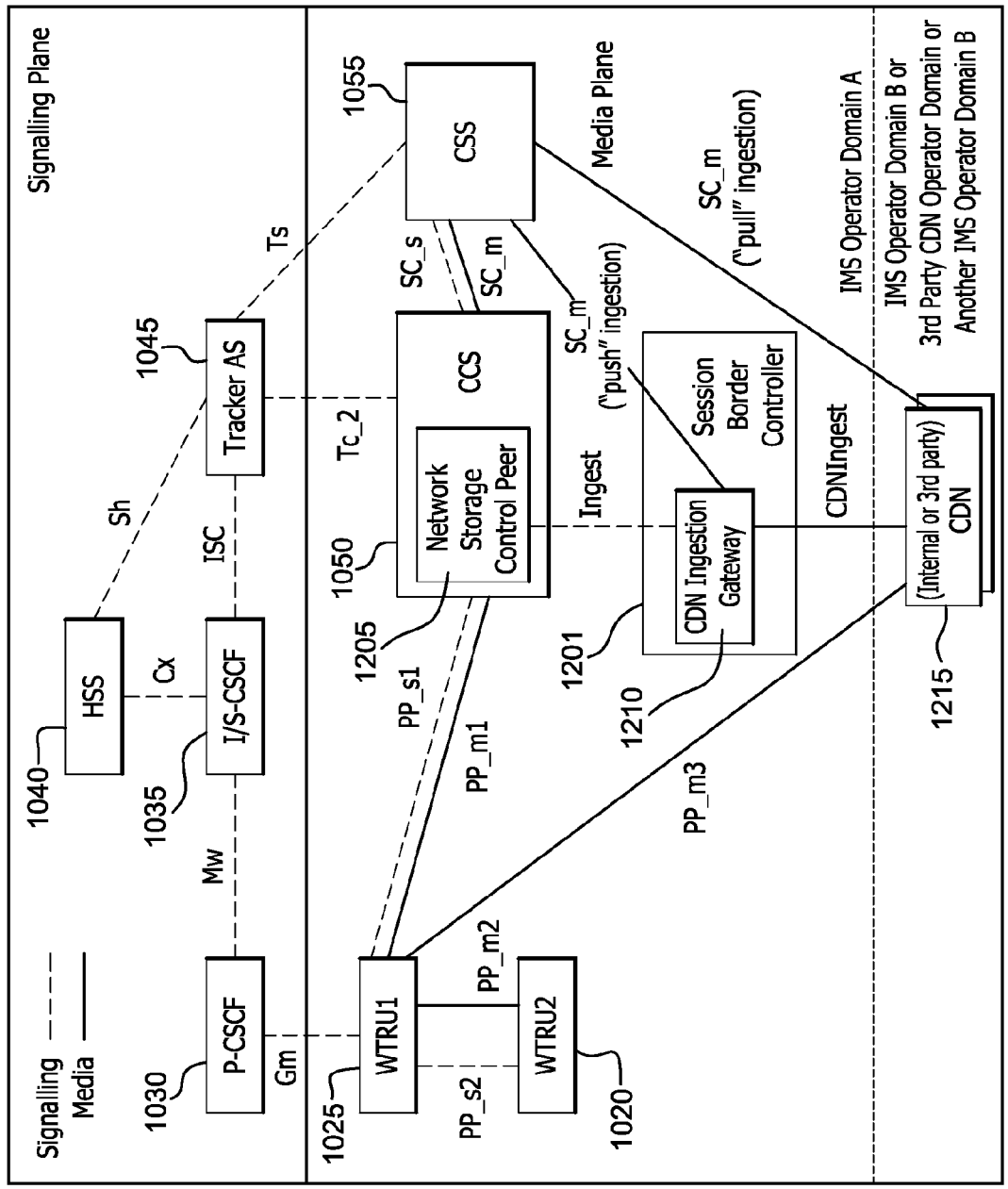
FIG. 12 is an example of a deployment option using a hybrid CCS and SBC.
Figure 13:
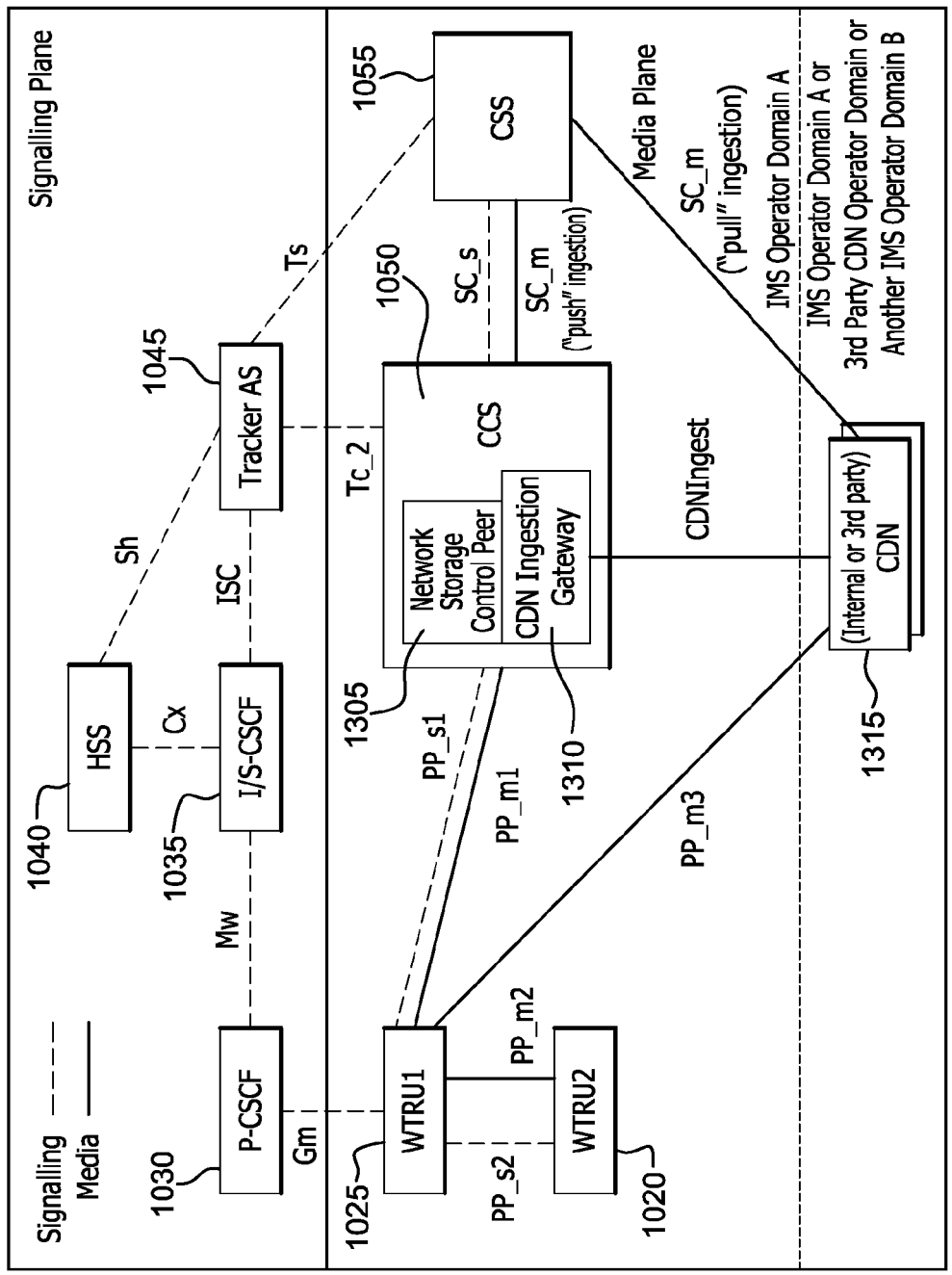
FIG. 13 is an example of a deployment option using CCS.

FIGS. 11, 12 and 13 describe additional deployment options, other than using dedicated nodes. FIGS. 11, 12, and 13 are similar to FIG. 10 with the exception of the location of the NSCP, CDN Ingestion Gateway, and the Internal or $3^{rd}$ Party CDN.

FIG. 11 is an example of a deployment option using SBC. In FIG. 11 NSCP 1105 and CDN Ingestion Gateway 1110 are both located in Session Border Controller 1101. Internal or $3^{rd}$ Party CDN 1115 is not within Session Border Controller 1101, remains in the IMS Operator domain or $3^{rd}$ Party Domain.

FIG. 12 is an example of a deployment option using a hybrid CCS and SBC. In FIG. 12, NSCP 1205 is located in CSS 1050. CDN Ingestion Gateway 1210 is located within Session Border Controller 1201. Internal or $3^{rd}$ Party CDN 1215 is not within either CSS 1050 or Session Border Controller 1201, remains in the IMS Operator domain or $3^{rd}$ Party Domain.

FIG. 13 is an example of a deployment option using CCS. In FIG. 13, NSCP 1305 and CDN Ingestion Gateway 1310 are both located in CSS 1050. Internal or 3$^{rd}$ Party CDN 1215 is not within CSS 1050, remains in the IMS Operator domain or 3$^{rd}$ Party Domain.

Figure 14:
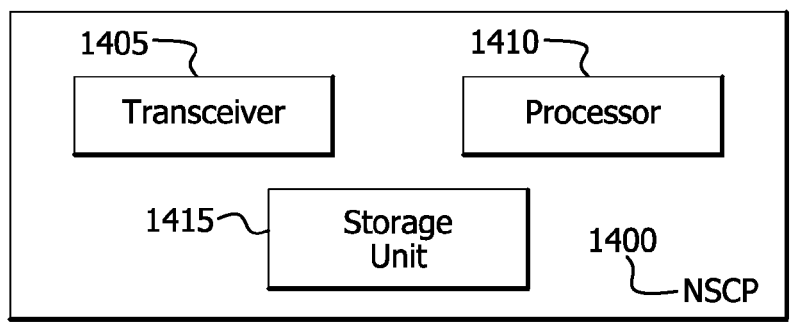
FIG. 14 is an example of an NSCP.

FIG. 14 is an example of an NSCP. NSCP 1400 may include a transceiver 1405, a processor 1410, and a storage unit 1415. Transceiver 1405 may transmit and receive information between the NSCP 1400 and a tracker regarding peers and swarms. Processor 1410 may process the peer information received from the tracker. Storage unit 1415 may store peer information received from the tracker.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for use in a network storage control peer (NSCP) supporting peer to peer (P2P) operation, the method comprising:
    receiving swarm stats from a tracker;
    determining, based on the received swarm stats, a P2P rarity associated with a content piece; and
    responsive to the determined P2P rarity, transmitting an upload request message to an ingestion gateway, wherein the upload request message indicates that the content piece is to be uploaded to a content delivery network (CDN).

2. The method of claim 1, wherein the swarm stats include a list of swarms.

3. The method of claim 1, wherein the swarm stats are received in a STAT_REPORT message formatted by the tracker for reporting stats to a peer.

4. The method of claim 1, wherein the upload request message includes a swarm identification (ID) and a content piece ID associated with the content piece.

5. The method of claim 1, wherein the NSCP is located in at least one of a CDN cache server, a content source server (CSS), and a session border controller (SBC).

6. The method of claim 1, further comprising receiving an upload response from the CDN.

7. The method of claim 6, wherein the upload response includes a CDN uniform resource identifier (URI).

8. The method of claim 1, wherein the NSCP obtains the content piece from a P2P peer for uploading to the CDN.

9. The method of claim 8, wherein the content piece is uploaded from the NSCP to the CDN via the ingestion gateway.

10. A network storage control peer (NSCP) comprising:
    a transceiver configured to receive swarm stats from a tracker; and
    a processor configured to determine, based on the received swarm stats, a P2P rarity associated with a content piece,
    the transceiver being further configured to transmit, responsive to the determined P2P rarity, an upload request message to an ingestion gateway, wherein the upload request message indicates that the content piece is to be uploaded to a content delivery network (CDN).

11. The NSCP of claim 10, wherein the swarm stats include a list of swarms.

12. The NSCP of claim 10, wherein the swarm stats are received in a STAT_REPORT message formatted by the tracker for reporting stats to a peer.

13. The NSCP of claim 10, wherein the upload request message includes a swarm identification (ID) and a content piece ID associated with the content piece.

14. The NSCP of claim 10, wherein the NSCP is located in at least one of a CDN cache server, a content source server (CSS), and a session border controller (SBC).

15. The NSCP of claim 10, the transceiver further configured to receive an upload response from the CDN.

16. The NSCP of claim 15, wherein the upload response includes a CDN uniform resource identifier (URI).

17. The NSCP of claim 10, the processor further configured to obtain the content piece from a P2P peer for uploading to the CDN.

18. The NSCP of claim 17, wherein the content piece is uploaded from the NSCP to the CDN via the ingestion gateway.

19. A method for use in a network storage control peer (NSCP) supporting peer to peer (P2P) operation, the method comprising:
    receiving swarm stats from a tracker;
    determining, based on the received swarm stats, a high peer-population level associated with a content piece; and
    responsive to the determined high peer-population level, transmitting a delete request message to an ingestion gateway, wherein the delete request message indicates that the content piece is to be deleted from a content delivery network (CDN).

20. The method of claim 19, wherein the delete request message includes a swarm identification (ID) and the content piece ID associated with the content piece.

* * * * *